(12) United States Patent
Benjey

(10) Patent No.: US 6,874,484 B2
(45) Date of Patent: Apr. 5, 2005

(54) FUEL VAPOR VENT SYSTEM AND LOW PERMEATION VACUUM OPERATED SHUT-OFF VALVE THEREFOR

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 42 days.

(21) Appl. No.: 10/308,402

(22) Filed: Dec. 3, 2002

(65) Prior Publication Data

US 2004/0103886 A1 Jun. 3, 2004

(51) Int. Cl.[7] .................................................. F02M 33/02
(52) U.S. Cl. ...................................... 123/520; 137/907
(58) Field of Search ........................... 123/520, 519, 123/518, 516, 215, 217, 511, 526, 907

(56) References Cited

U.S. PATENT DOCUMENTS

| | | | |
|---|---|---|---|
| 4,153,025 A | * 5/1979 | Thornburgh | 123/520 |
| 5,156,178 A | * 10/1992 | Harris | 137/43 |
| 5,261,439 A | * 11/1993 | Harris | 137/43 |
| 5,327,934 A | * 7/1994 | Thompson | 137/588 |
| 5,562,757 A | 10/1996 | Brun et al. | 96/113 |
| 5,564,466 A | 10/1996 | Aoyama et al. | 137/493.8 |
| 5,722,468 A | 3/1998 | Kido | 141/59 |
| 6,354,280 B1 | 3/2002 | Itakura et al. | 123/519 |
| 2002/0153375 A1 | 10/2002 | Harris | 220/203.24 |

* cited by examiner

Primary Examiner—Mahmoud Gimie
(74) Attorney, Agent, or Firm—Roger A. Johnston

(57) ABSTRACT

A vacuum operated flow control valve is disposed in the vapor vent line from a fuel tank to a vapor storage canister connected also to the engine air inlet. The valve has a diaphragm operator of low permeability which is biased normally open to permit fuel vapor to flow from the tank to the canister during engine shutdown. Upon engine startup a vacuum is drawn in the canister and the flow control valve which closes preventing vacuum being drawn in the tank thereby preventing tank collapse. During engine shutdown, if an ambient temperature drop creates a vacuum in the tank, the flow control valve closes; however, an emergency umbrella relief valve opens permitting reverse flow of vapor from the canister to the tank preventing excessive vacuum in the tank.

16 Claims, 3 Drawing Sheets

FUEL VAPOR VENT SYSTEM AND LOW PERMEATION VACUUM OPERATED SHUT-OFF VALVE THEREFOR

BACKGROUND OF THE INVENTION

The present invention relates to systems for controlling emission of fuel vapors from a motor vehicle fuel tank. Present regulations require that fuel vapor vented from the tank be contained and stored during periods of engine inoperation. Typically, the vapor is stored in a reservoir or canister filled with adsorbents such as granulated carbon or charcoal. Upon engine startup, an electronically controlled solenoid valve is operated to control flow of vapor from the storage canister to the engine air inlet. Atmospheric air is admitted to purge the canister through an electronic solenoid valve.

Heretofore, problems have been encountered in purging the canister during engine operation and drawing vacuum in the canister and the fuel tank in the event of failure of the solenoid valve in open position. During periods of engine inoperation ambient cooling of the fuel tank may also create vapor condensation and a vacuum in the tank, which can collapse the tank. Thus, it has long been desired to provide a way or means of controlling vapor flow in the system and preventing a vacuum in the fuel tank also to provide for proper vapor venting to the storage canister, particularly where vapor pressure exceeds a predetermined limit value in the tank during periods of vehicle operation in elevated ambient temperature conditions.

Furthermore, where a mechanism or valve is to be employed for controlling the flow of vapor to the canister and preventing such a vacuum, the mechanism must of necessity be of very low permeability so as to prevent migration or escape of fuel vapor over time to the atmosphere when the mechanism is permitting flow of vapor from the tank to the canister during periods of engine inoperation.

BRIEF SUMMARY OF THE INVENTION

The present invention provides a diaphragm operated valve biased to the open condition for controlling flow of fuel tank vapor to a storage canister having one side of the diaphragm vented to the atmosphere with the diaphragm formed of or coated with a material of low permeability to prevent escape of vapor to the atmosphere by migration through the diaphragm. The valve is closed by the pressure differential across the diaphragm upon the engine purging vapor from the canister and creating a vacuum in the vent line. An emergency pressure relief valve is provided in the event that excessive vacuum is experienced in the fuel tank from cooling during periods of engine inoperation or water quenching.

DETAILED DESCRIPTION OF THE INVENTION

Figure 1:
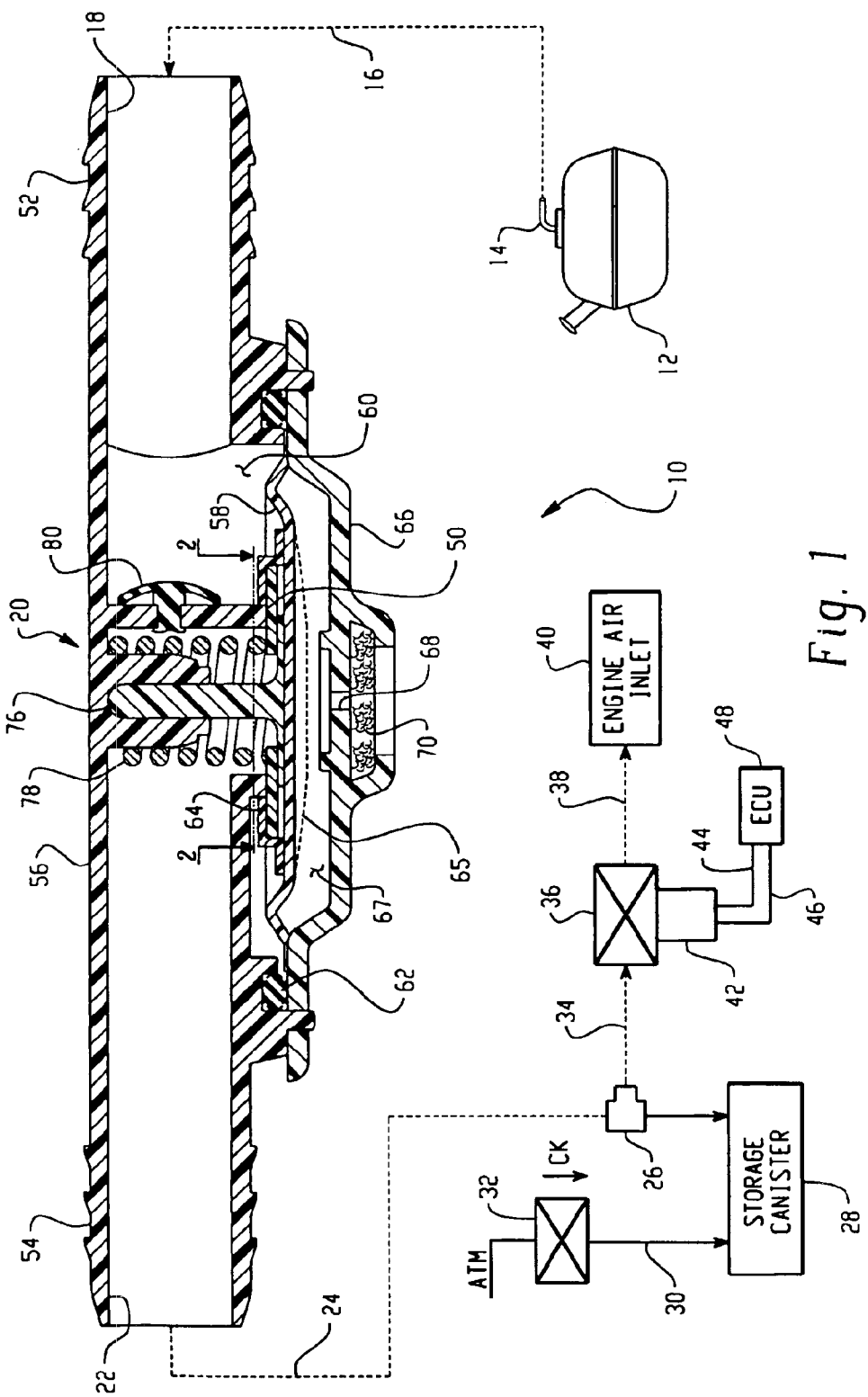
FIG. 1 is a pictorial schematic of a system for controlling fuel tank vapor emission embodying the present invention with a vacuum valve in cross-section.

Referring to FIG. 1, the system of the present invention is embodied for controlling fuel vapor emission as indicated generally at 10 and includes a fuel tank 12 having a vapor vent outlet 14 which may include a float operated vent and rollover valve, which outlet is connected along line 16 to the inlet 18 of a vacuum operated vent valve indicated generally at 20. Valve 20 has an outlet 22 connected along conduit 24 to a Tee 26 which is connected to the inlet of a storage reservoir or canister 28 which has an atmospheric purge inlet line 30 controlled by a one-way or check valve 32. Tee 26 is also connected along conduit 34 to the inlet of a valve 36 which has its outlet connected along line 38 to the air inlet of the vehicle engine denoted by reference numeral 40. Valve 36 may be operated by a solenoid 42 connected by leads 44, 46 to an electronic control unit 48 powered by the vehicle power supply.

Valve 20 has a valve seat 50 formed therein which openly communicates with outlet passage 22; and, when valve seat 50 is opened permits communication with the inlet passage 18. In the present practice of the invention, the inlet passage 18 and the outlet passage 22 are formed in fittings denoted respectively 52, 54 which preferably are integrally formed in a valve body 56 but may also be separate fittings attached to the body.

A pressure responsive member, preferably a flexible diaphragm 58 provides a portion of the wall of a valving chamber 60 in body 56; and, diaphragm 58 is sealed therein by a suitable annular seal such as O-ring 62. Diaphragm 38 has a resilient preferably elastomeric valving member 64 attached thereto for movement therewith and which is seated against valve seat 50 in the closed condition. The diaphragm 58 is formed of a polymeric material having a relatively low vapor permeability preferably polytetrafluoroethylene (PTFE) and polyethylene teraphthalate (PET); however, it will be understood that other polymeric materials of relatively low vapor permeability may be employed to further the vapor impermeability and the surface of the PET may be metallized.

The side of the diaphragm 58 opposite valve member 64, is covered by a housing or cap 66 forming a chamber 67 which is vented to the atmosphere through port 68 and filter material 70.

Figure 2:
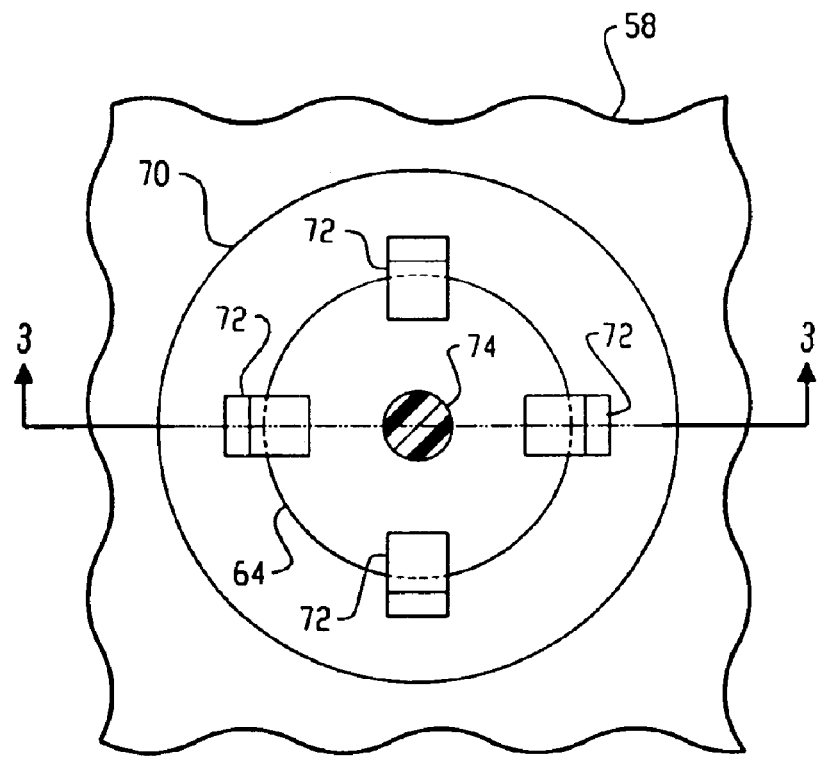
FIG. 2 is a section view taken along section indicating lines 2—2 of FIG. 1.
Figure 3:
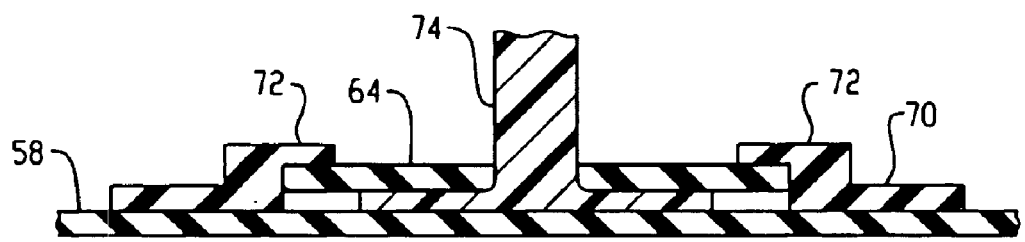
FIG. 3 is a section view taken along section indicating lines 3—3 of FIG. 2.
Figure 4:
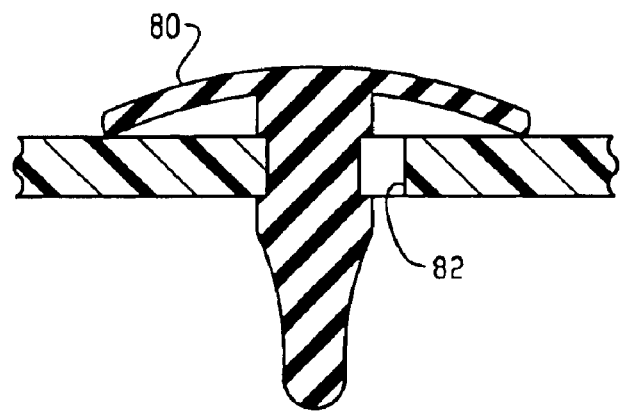
FIG. 4 is an enlarged view of a portion of the vacuum relief valve of FIG. 1 in the closed condition.
Figure 5:
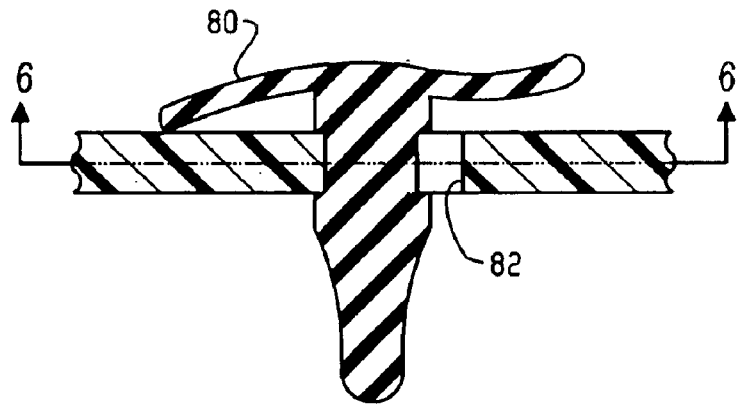
FIG. 5 is a view similar to FIG. 4 with the vacuum relief valve in the open condition; and, FIG. 6 is a section view taken along section indicating lines 6—6 of FIG. 5.
Figure 6:
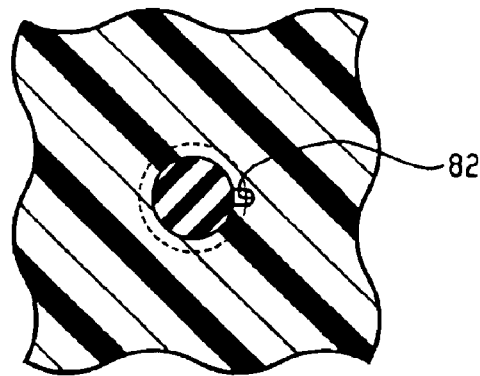

Referring to FIGS. 2 and 3, the diaphragm 58 is shown with an attachment member 72 which has valve member 64 retained thereon by lugs or tabs 72 formed preferably integrally therewith. Member 72 includes a pilot projection 74 extending therefrom which is slidably received in a bore 76 provided in the valve body 56 for guiding movement thereof (see FIG. 1). The valve 64 and member 72 are biased in a direction away from valve seat 50 by a spring 78 registered thereagainst.

Referring to FIGS. 1, 4, 5 and 6, a pressure relief valve preferably of the umbrella type indicated generally at 80 is disposed in the inlet 18 and provides a passage 82 through the wall of the valving chamber 60. Upon the occurrence of an excessive vacuum in the tank valve member 64 is closed on seat 50 and a pressure differential is created across umbrella 80 sufficient to raise the umbrella portion of the valve 80 to the position shown in FIG. 5 to permit reverse vapor flow from the canister to passage 22 through passage 82, passage 18 and conduit 16 to the tank 12.

The present invention thus provides a diaphragm operated vacuum actuated valve for controlling flow of fuel vapor in a motor vehicle fuel tank vapor emission control system. The vacuum operated valve includes a diaphragm utilizing vapor impervious material or coating on the surface of the diaphragm to prevent migration of fuel vapor therethrough to the atmosphere. The valve of the present invention prevents the purge of the canister upon engine start up from creating excessive vacuum in the fuel tank and also provides for vapor flow back to the tank in the event of excessive vacuum in the tank as experienced upon a sudden lowering of ambient temperatures.

Although the invention has hereinabove been described with respect to the illustrated embodiments, it will be understood that the invention is capable of modification and variation and is limited only by the following claims.

What is claimed is:

1. A system for controlling fuel tank vapor emission comprising:
    (a) a valve body having an inlet connected for receiving fuel vapor from the tank and an outlet with a valving chamber communicating with the inlet and outlet;
    (b) storage device connected to said outlet and the air inlet of an engine;
    (c) a pressure responsive member forming a moveable wall portion of the pressure chamber and operable for movement between a first position preventing and a second position permitting flow between said inlet and outlet wherein one side of said pressure responsive means opposite said chamber is vented to the atmosphere and said pressure responsive member includes a surface thereof impervious to fuel vapor for preventing permeation of fuel vapor therethrough to the atmosphere.

2. The system defined in claim 1, wherein said pressure responsive member includes a moveable valve member and said valving chamber includes a valve seat, wherein said valve member is closed against said seat in said first position.

3. The system defined in claim 1, wherein said valving chamber includes a pressure relief valve operable to open upon the occurrence of a predetermined vacuum in said fuel tank.

4. The system defined in claim 1, wherein said pressure responsive member includes a valve member closed against a valve seat in said first position and opened from said valve seat in said second position.

5. The system defined in claim 4, wherein said valve member is formed of polymeric material.

6. The system defined in claim 1, wherein said storage device is connected to an electrically operated valve for controlling flow to the engine air inlet.

7. The system defined in claim 1, wherein said pressure responsive member includes a flexible diaphragm.

8. The system defined in claim 7, wherein said diaphragm is formed of polyethylene teraphthalate (PET) material.

9. The system defined in claim 7, wherein said flexible diaphragm has a metallized coating on the surface thereof forming a wall portion of said valving chamber.

10. The system defined in claim 7, wherein said flexible diaphragm has an elastomeric valve member attached thereto.

11. The system defined in claim 1, wherein said pressure responsive member is biased to said second position.

12. The system defined in claim 1, wherein said pressure responsive member comprises a flexible diaphragm with a rigid member attached thereto and guided for said movement by certain surfaces on said body.

13. A method of controlling vapor emissions from a fuel tank, comprising:
    (a) connecting a vapor storage device to a fuel tank vapor vent and disposing a pressure responsive valve in the line between said tank and said device;
    (b) connecting said device to the air inlet of a fuel burning engine;
    (c) disposing a flexible diaphragm of material having a relatively low fuel vapor permeability in said valve and biasing said diaphragm to a position permitting flow through said valve, and upon the occurrence of a vacuum in one of said storage device and said tank creating a differential pressure on said pressure responsive member and closing said valve; and,
    (d) venting one side of the diaphragm to the atmosphere.

14. The method defined in claim 13, wherein said step of disposing a diaphragm includes disposing a metallized coating on said diaphragm.

15. The method defined in claim 13, wherein said step of disposing a diaphragm includes disposing a diaphragm formed of one of polytetrafluoroethylene (PTFE) and polyethylene teraphthalate (PET) material.

16. The method defined in claim 13, further comprising disposing a pressure relief valve in said line and permitting reverse flow in response to a vacuum greater than a predetermined level.

* * * * *